United States Patent [19]
Bronstert et al.

[11] Patent Number: 4,985,503
[45] Date of Patent: Jan. 15, 1991

[54] PREPARATION OF IMPACT-RESISTANT POLY(ALKYL)STYRENE

[75] Inventors: Klaus Bronstert, Carlsberg; Hans Hoenl, Obersuelzen; Adolf Echte, Ludwigshafen; Peter Klaerner, Battenberg, all of Fed. Rep. of Germany

[73] Assignee: BASF Aktiengesellschaft, Ludwigshafen, Fed. Rep. of Germany

[21] Appl. No.: 338,556

[22] Filed: Apr. 14, 1989

Related U.S. Application Data

[62] Division of Ser. No. 30,483, Mar. 27, 1987, abandoned.

[30] Foreign Application Priority Data

Apr. 8, 1986 [DE] Fed. Rep. of Germany ....... 3611705

[51] Int. Cl.$^5$ .................. C08L 9/00; C08L 51/04
[52] U.S. Cl. .................. 525/193; 525/243; 525/263; 525/265; 525/316; 525/71; 524/504
[58] Field of Search .............. 525/316, 193, 206, 263, 525/265, 242, 243, 71, 72, 87

[56] References Cited

U.S. PATENT DOCUMENTS 4,169,115  9/1979  Tung et al. .
4,294,937  10/1981 Whitehead .

FOREIGN PATENT DOCUMENTS 1174214  12/1969  United Kingdom .
1576772  10/1980  United Kingdom .

Primary Examiner—Allan M. Lieberman
Attorney, Agent, or Firm—Keil & Weinkauf

[57] ABSTRACT

Process for preparing impact-resistant translucent rubber-modified polystyrene by polymerizing compounds of the styrene class in the presence of a rubber containing thiol groups.

4 Claims, No Drawings

PREPARATION OF IMPACT-RESISTANT POLY(ALKYL)STYRENE

This application is a division of application Ser. No. 030,483, filed on Mar. 27, 1987, now abandoned.

The present invention relates to a process for preparing impact-resistant rubber-modified poly(alkyl)styrene by polymerizing a reaction batch consisting of styrene, ring-alkylated styrenes, sidechain-alkylated styrenes or mixtures thereof and one or more rubbery polymers P with thiol groups P-$(SH)_x$, where x is an integer from 1 to 5.

Relevant prior art can be found in:
(1) German Laid-Open Application DOS 1,769,118
(2) European Patent 0,021,488
(3) German Published Application DAS 2,613,352 and
(4) German Laid-Open Application DOS 2,813,328.

(1) and (2) describe the preparation of impact-resistant non-translucent polystyrene. To prepare these products use is made of mixtures of polybutadiene and styrene/butadiene block copolymers. In the process described in (3), translucent impact-resistant polystyrenes are obtained batchwise using styrene/butadiene block copolymers.

Furthermore, (4) describes a process for preparing block copolymers wherein polymers having primary or secondary thiol end groups are brought into contact with a monomer capable of undergoing free radical polymerization and a free radical polymerization is initiated. The product formed is not impact-resistant polystyrene, but a block copolymer which contains one or more blocks of the starting polymer and one or more blocks from the free radical polymerization.

Styrene/butadiene block copolymers are more costly than polybutadiene rubbers. In addition, they have a comparatively high solution viscosity, which is a nuisance in particular in the production of impact-resistant polystyrene of high rubber content.

It is an object of the present invention to replace the relatively costly block rubbers used in (3) by less costly rubbers which can likewise lead to translucent, impact-resistant polystyrene and in addition have a lower solution viscosity.

The present invention provides a process for preparing impact-resistant translucent rubber-modified polystyrene and/or poly(alkyl)styrene, wherein a reaction batch consisting of styrene, ring-alkylated styrene, sidechain-alkylated styrene or mixtures thereof and one or more rubbery polymers is polymerized.

This process comprises carrying out the polymerization batchwise in a two-stage process by polymerizing in the first stage thermally or in the presence of free radical initiators by stirring in the absence of a solvent for from 3 to 6 hours to a conversion of from 20 to 40%, based on the monomer, the stirring being carried out in such a way that thereafter the flexible component dispersed in the polystyrene has a median particle diameter of from 0.1 to 0.8 μm, the starting rubbery polymer conforming to the formula P-$(SH)_x$, where x denotes the number of thiol groups per rubber molecule and is an integer from 1 to 5 and P is a polymer of conjugated dienes, and subsequently dispersing the product thus obtained in a second stage, after addition of a free radical initiator, in an aqueous phase which contains suspending assistants and buffer salts and polymerizing in the course of from 5 to 15 hours to a conversion of from 95 to 99.95%, based on the monomer.

The process according to the invention makes it possible, on the one hand, to prepare translucent impact-resistant polystyrenes or polyalkylstyrenes using rubbers based on polybutadiene. On the other hand, the preparation of non-translucent products having improved properties is possible.

In what follows, the process according to the invention and the starting materials required for carrying it into practice are described in more detail.

Processes for preparing impact-resistant polystyrene are known from (1), (2) or German Published Application No. DAS 1,770,392. Processes for preparing impact-resistant and at the same time translucent polystyrene are also described in publication (3).

The process according to the invention, in line with the existing processes, is carried out batchwise in two or more stages, the rubbery polymer dissolved in the monomers (for example styrene) being prepolymerized in the first stage in a conventional manner by stirring, i.e. under the action of shearing forces.

The prepolymerization is applied to a reaction batch which, for the purposes of the present invention, consists of the monomers and the rubbery polymer, the rubbery polymer being present in the reaction batch in an amount of from 3 to 30% by weight, preferably from 4 to 16 and in particular from 5 to 14% by weight, based on the mixture of monomers and rubbery polymer.

This first stage of the process is followed by a second stage where the polymerization is carried out in suspension.

Suitable monomers are styrene, alkyl-substituted styrenes or mixtures thereof. With the intended purpose in mind, it is preferable to use only inexpensive styrene. It is also preferable to use mixtures of styrene and ring-alkylated styrenes such as p-methyl-styrene or α-methylstyrene or other substituted styrenes.

Suitable rubbery polymers for the process according to the invention are the modified polydienes described hereinafter, which contain one, two, three, four or five terminal or randomly distributed SH groups. They can in general be characterized in terms of the formula P-$(SH)_x$, where P is a polymer of more than 80% conjugated dienes of 4 or 5 carbon atoms, such as butadiene or isoprene, or a copolymer of these monomers and up to 20% of aromatic vinyl, and x is an integer from 1 to 5.

The structure and preparation of products of this type is known to those skilled in the art, for example from (4), U.S. Pat. No. 3,755,269 and British Patents Nos. 1,432,782 and 1,432,783. These rubbery polymers are preferably prepared by anionic polymerization of, for example, a conjugated diene, such as butadiene, in a conventional manner in a solvent, preferably a hydrocarbon, such as sec.-butyllithium. On completion of the polymerization the living polymer is then reacted with one or more moles of ethylene sulfide, propylene sulfide or some other episulfide per mole of catalyst to incorporate a —$CH_2$—$CH_2$—S—Li or a —$CH_2$—CH—Li end group into the molecule. On using bifunctional starters for the polymerization, the rubber, after reaction with the sulfides mentioned, contains 2-S-Li end groups. It is further possible, although less preferable, to metallize completed rubbers in a conventional manner, for example as described in Metallation of unsaturated polymers and formation of graft polymers, Tate et al., J. Polym. Sci. Part A-1, 9 (1971), 139–145, and to convert the anionic groups which are thereby randomly distributed in the polymer molecule into -S-Li groups by means of the abovementioned sulfides.

The rubbery polymer P-(SH)$_x$ is preferably polybutadiene having only one mercaptan group. The average molecular weight (GPC average) of the rubbery polymer of the formula mentioned should be within the range from 20,000 to 200,000, preferably within the range from 30,000 to 100,000.

It is of course also possible to use mixtures of rubbery polymers of the general formula P-(SH)x with other, nonmodified rubbers, such as polybutadiene, polyisoprene and the like, these rubbers ideally having molecular weights within the range from 120,000 to 400,000. The mixtures should contain not less than 30% of the rubbery polymer P-(SH)$_x$. The mixing ratios should expediently be chosen in such a way that the average molecular weight of the mixture is within the range from 30,000 to 100,000.

The process according to the invention can be carried out in the first stage thermally or in the presence of peroxidic initiators which form free radicals. Suitable initiators of this type come from the group of the alkyl or acyl peroxides, such as hydroperoxides, peresters or peroxycarbonates. Preference is given to using the active graft initiators dibenzoyl peroxide, tert.-butyl peroxy-2-ethylhexanoate or tert.-butyl perbenzoate. The initiators are employed in amounts of from 0.02 to 0.2% by weight, based on the monomers. The employment of initiators is known to those skilled in the art; they further know that the decomposition of the initiators can be speeded up either by using additives such as amines or by choosing suitable temperature ranges in order to increase graft activity.

The process according to the invention can also be carried out in the presence of chain transfer agents. Suitable for this purpose are the customarily used mercaptans of 4 to 18 carbon atoms. Of the mercaptans mentioned, it is in particular n-butylmercaptan, n-octylmercaptan and n- or t-dodecylmercaptan which have proved suitable. The mercaptans are used in amounts of from 0.01 to 0.3% by weight, based on the monomers.

The process according to the invention can be also carried out in the presence of lubricants, in particular mineral oils. Preferably these agents are added to the reaction batch. Suitable, in particular, are white oils, ie. low-aromatics technical-grade white oils or aromaticsfree medicinal white oil; the latter in particular if the impact-resistant polystyrenes obtained by the process are used for preparing moldings which need to comply with legislation on food packaging. Stabilizers may also be present during the polymerization. Particularly suitable are customary amounts of known sterically hindered phenols.

In the process, polymerization is carried out in the first stage for from 3 to 6 hours to a conversion of from 20 to 40%, preferably from 25 to 35%, based on the monomer. The polymerization is carried out at elevated temperatures which, for the purposes of the present invention, are temperatures within the range from 50° to 200° C., in particular within the range from 60° to 150° C. The skilled worker knows how to select, from the temperature ranges mentioned, the temperature required for a particular type of process if certain initiators are used or if certain products are to be prepared. The process can be carried out isothermally or with a temperature profile.

The first stage is carried out in a reactor with stirring, the polymerization proceeding in such a way that, at a certain stage of conversion, two phases form, namely a coherent rubber/styrene phase and a noncoherent polystyrene/styrene phase. As conversion increases, a phase inversion takes place, and the polystyrene phase becomes coherent and the rubber/styrene phase noncoherent.

These processes are known and described, for example, in Echte, Haaf, Hambrecht, Angew. Chem. 93 (1981), 372–388. After the phase inversion it is necessary to continue stirring, ie. to employ suitable shearing conditions, known to those skilled in the art, to obtain the particular desired median particle size. The requisite shearing conditions are dependent, inter alia, on the given reactor size, the fillage, the nature of the filling material, the degree of viscosity and the type of stirrer element. The shearing conditions can be decided by a skilled worker by means of a few experiments. Relevant matter in this context can be found in Freeguard, J Appl. Polym. Sci. 15 (1971), 1649.

The shearing conditions are chosen in such a way that a dispersed flexible component having a median particle diameter of from 0.1 to 0.8 $\mu$m has developed within the modified polystyrene. The d$_{50}$ value is to be understood here as a number average. Preferably the median particle size can also be within the range from 0.2 to 0.6 $\mu$m. The result of polymerization of the first stage is a product containing a graft copolymer of styrene on the rubbery polymer which forms the flexible phase. This flexible phase is finely divided in the rigid matrix, ie. the polystyrene, and can be depicted on electron micrographs of thin sections. The particles are capsule particles. ie. particles which contain a rubber wall but no further rubber structural elements within the particle.

The reaction product of the first stage is then polymerized to completion in aqueous suspension in the second stage The aqueous phase of the suspension amounts to from 0.75 to 2 times the phase of the reaction product of the first stage. The aqueous phase contains the usual water-soluble suspending aids, such as methyl cellulose, oxypropyl cellulose, polyvinyl alcohol or polyvinylpyrrolidone, or insoluble inorganic dispersants, such as barium sulfate. A soluble dispersant is in general used in an amount of from 0.05 to 2% by weight, based on the dispersion. The reactor is likewise stirred in the second phase, so that a bead polymer forms. Procedures of this type are known. They are described for example in reference (3). The polymerization is carried out at from 50° to 200° C. The polymerization can be carried out isothermally or with an increasing temperature profile. It is necessary to add an initiator which decomposes into free radicals to the reaction batch before the dispersing stage. Suitable initiators are the same as those used above in the description of the first stage of the process. In general, from 0.01 to 0.30 part by weight of initiator, based on the monomers, is used in the first process stage and from 0.01 to 0.20 part by weight of the initiator, based on the parts by weight of monomers, in the second stage.

On completion of the polymerization, the polymer is isolated in a conventional manner. This can be effected, for example, by degassing the mixture on a degassing extruder, where the product is freed from excess styrene and, as the case may be, solvent. Suitable conditions for this procedure are temperatures of from 180° to 260° C. and, in the last degassing stage, pressures of from 2 to 80 mbar.

The impact-resistant and, as the case may be, translucent polystyrenes obtained by the process according to the invention can be processed in a conventional manner for thermoplastics, for example by extruding, injection molding, calendering, blowmolding, pressing or sintering. It is particularly preferred to process the products prepared by the process according to the invention into shaped structures by injection molding. Translucent products are suitable in particular for producing films for the packaging sector, eg. those which are used in the food sector.

The properties listed in respect of samples of products obtained in the Examples and Comparative Experiments were measured as follows:

1. The viscosity number VZ of the rigid matrix in ml/g was determined in accordance with DIN 53,724.
2. The tensile stress ST in $N/mm^2$ was determined in accordance with DIN 53,455.
3. The hole impact strength $a_{kl}$ in $kJ/m^2$ was determined by the method of DIN 53,753.
4. To assess the translucence TL of products obtained with the process according to the invention, first a scale was established. This scale encompassed ratings 1 to 9 of Table 1 below, a low rating signifying a high translucence. To define the ratings listed in Table 1, a commercially available impact-resistant polystyrene (polystyrene KR 2791 from BASF Aktiengesellschaft) with capsule particle morphology was assigned the rating 4. Blends of this product with commodity polystyrene of viscosity number 96 ml/g in the weight ratios mentioned in Table 1 gave values of from 3 to 1 in respect of translucence. By blending with a commercially available impact-resistant polystyrene with cell particle morphology (polystyrene 476 L from BASF Aktiengesellschaft) mixtures of lower translucence, ie. having the values 5 to 9 of the Table, were obtained. Measurement was effected by visual comparison of 2 mm thick compressed platelets of sample material with similar platelets made of the calibrating substance mentioned. Electron micrographs of thin sections of the samples of the Examples and Experiments were prepared in a conventional manner and used to determine the particle size of the flexible component phase.

TABLE 1

| Translucence rating | Product A | Blend with parts by weight of commodity polystyrene | Product B |
|---|---|---|---|
| 1 | 20 | 80 | 0 |
| 2 | 40 | 60 | 0 |
| 3 | 60 | 40 | 0 |
| 4 | 100 | 0 | 0 |
| 5 | 96 | 0 | 4 |
| 6 | 92 | 0 | 8 |
| 7 | 88 | 0 | 12 |
| 8 | 84 | 0 | 16 |
| 9 | 80 | 0 | 20 |

The invention is hereinafter illustrated in more detail by reference to Examples. Parts and percentages are by weight, unless otherwise stated.

EXAMPLES 1 to 22

To the parts by weight of conventional nonmodified polybutadiene (Buna CB HX 529 C from Bayer) and of modified polybutadiene P $(SH)_x$ (PB $CH_2CH_2SH$) indicated in Table 2 were added 2.3 parts by weight of a white oil and sufficient parts by weight of styrene to bring the total amount of these constituents to 100. In addition, 0.12 part by weight of a sterically hindered phenol was added as a stabilizer to the reaction batch.

Table 2 also indicates the average molecular weights of the modified polybutadiene grades and the proportions of t-dodecylmercaptan (TDM) and of dibenzoyl peroxide (BPO).

In a 5 liter capacity kettle equipped with a horseshoe stirrer, the starting mixtures reproduced in Table 2 were thermally polymerized in the presence of TDM at 123° C. (or at 86° C. if 0.1% by weight of BPO was used) under isothermal conditions in the absence of a solvent to a conversion of 35% in each case. In all cases the stirrer speed was 200 revolutions per minute.

Thereafter, the polymerization was continued in aqueous suspension. To this end, 0.1 part of dicumyl peroxide and, per kilogram of the reaction mixture obtained, 900 ml of water, 9.0 g of a suspension assistant based on polyvinylpyrrolidone and 1.8 g of sodium phosphate were added. The suspension polymerization was carried out at a fillage of 90% and 300 r.p.m. under isothermal conditions in each case at 110° C. for 3 hours, at 130° C. for 3 hours and 140° C. for 4 hours to a conversion of 100%, based on styrene. Finally, the fully polymerized product beads were filtered off, washed with tap water and dried at 60° C. and 14 mm Hg.

Table 2 reveals that if PB—$CH_2CH_2$—SH alone is added the most favorable molecular weight range of the rubber extends to from 20,000 to 150,000, resulting in impactresistant and at the same time translucent polystyrenes.

Furthermore, it is evident that mixtures of customary, nonmodified polybutadiene PB and PB—$CH_2CH_2$—SH likewise lead to impact-resistant translucent polystyrene. The values of Table 2 finally show that by means of PB—$CH_2CH_2$—SH it is possible to produce translucent impact-resistant polystyrene not only thermally but also by means of peroxide initiators.

Moreover, it is advantageous that the process according to the invention, if rubbery polymer $R(SH)_x$ alone is used, can be carried out with amounts of up to about 25% by weight (based on the reaction batch) without problems. In the case of customary polybutadienes, even amounts of 15% by weight of rubber lead to viscosity problems in mass polymerizations.

The samples from Experiments Nos. 5, 6, 9 and 12 do not exhibit sufficient translucence and thus are not to be cited as illustrative of the preferred process for producing impact-resistant and translucent poly(alkyl)styrenes. On comparing Experiment 9 with Experiment 18 it is found that, in the case of polymerization using free radical initiators, even an amount of only 33% of rubber $R(SH)_x$, based on the total amount of modified and nonmodified rubber, still produces an acceptable translucence of 4.0. In the case of the procedure without peroxide initiator, the proportion of $R(SH)_x$ in the total amount of rubber should not be less than 50% (cf. Experiment 8 in conjunction with Experiment 9).

TABLE 2

| No. | 1 | 2 | 3 | 4 | 5 | 6 | 7 | 8 | 9 | 10 | 11 |
|---|---|---|---|---|---|---|---|---|---|---|---|
| PB (%) | 0 | 0 | 0 | 0 | 0 | 0 | 1.98 | 3.95 | 5.92 | 1.98 | 3.95 |
| PB CH$_2$ CH$_2$ SH (%) | 7.90 | 7.90 | 7.90 | 7.90 | 7.90 | 7.90 | 5.92 | 3.95 | 1.98 | 5.92 | 3.95 |
| MW (PB CH$_2$ CH$_2$ SH) × 10$^{-3}$ | 38 | 60 | 85 | 105 | 160 | 250 | 38 | 38 | 38 | 60 | 60 |
| TDM (%) | 0.1 | 0.1 | 0.1 | 0.1 | 0.1 | 0.1 | 0.1 | 0.1 | 0.1 | 0.1 | 0.1 |
| BPO (%) | 0 | 0 | 0 | 0 | 0 | 0 | 0 | 0 | 0 | 0 | 0 |
| VZ (ml/g) | — | 72.5 | 73.8 | 74.1 | 72.2 | 70.8 | 73.2 | 72.2 | 70.3 | 71.6 | 70.3 |
| ST (N/mm$^2$) | 28.4 | 31.9 | 36.2 | 33.6 | 27.6 | 21.4 | 35.9 | 35.6 | 32.7 | 31.7 | 33.8 |
| a$^{kl}$ (kJ/m$^2$) | 9.1 | 5.3 | 5.5 | 6.7 | 10.0 | 10.2 | 3.8 | 4.1 | 5.5 | 6.1 | 6.2 |
| TL | 2.0 | 2.5 | 3.0 | 6.0 | 10.0 | 10.0 | 2.5 | 4.5 | 10.0 | 4.5 | 6.0 |
| Flexible phase [μm] d$_{50}$ value (ca.) | — | 0.5 | 0.5 | 1.0 | 2.0 | 3.0 | 0.2 | 0.2 | 1.0 | 0.2 | 0.2 |

| No. | 12 | 13 | 14 | 15 | 16 | 17 | 18 | 19 | 20 | 21 | 22 |
|---|---|---|---|---|---|---|---|---|---|---|---|
| PB (%) | 5.92 | 0 | 0 | 0 | 1.98 | 3.95 | 5.92 | 0 | 1.98 | 3.95 | 5.92 |
| PB CH$_2$ CH$_2$ SH (%) | 1.98 | 15.80 | 23.70 | 7.90 | 5.92 | 3.95 | 1.98 | 7.90 | 5.92 | 3.95 | 1.98 |
| MW (PB CH$_2$ CH$_2$ SH) × 10$^{-3}$ | 60 | 60 | 60 | 38 | 38 | 38 | 38 | 60 | 60 | 60 | 60 |
| TDM (%) | 0.1 | 0.1 | 0.1 | 0 | 0 | 0 | 0 | 0 | 0 | 0 | 0 |
| BPO (%) | 0 | 0 | 0 | 0.1 | 0.1 | 0.1 | 0.1 | 0.1 | 0.1 | 0.1 | 0.1 |
| VZ (ml/g) | 72.2 | — | — | — | — | — | 127.2 | — | — | 129.5 | 123.7 |
| ST (N/mm$^2$) | 32.5 | — | — | 54.4 | 51.6 | 44.7 | 41.5 | 41.1 | 45.4 | 41.3 | 37.6 |
| a$_{kl}$ (kJ/m$^2$) | 7.8 | —$^1$ | —$^1$ | 5.2 | 4.3 | 6.7 | 4.5 | 4.5 | 4.5 | 5.4 | 7.1 |
| TL | 10.0 | 10.0 | 10.0 | 3.0 | 4.5 | 4.5 | 4.0 | 5.5 | 6.5 | 6.0 | 4.5 |
| Flexible phase [μm] d$_{50}$ value (ca.) | 0.8 | 5.0 | — | 0.1 | 0.1 | 0.1 | 0.2 | 0.2 | 0.2 | 0.2 | 0.3 |

$^1$rubbery

We claim:

1. Impact-resistant translucent rubbermodified polystyrene or poly(alkyl)styrene as obtained by a twostage process comprising polymerizing, in a first stage, a batch consisting of 70 to 97% by weight of styrene, ring-alkylated styrene, side-chain-alkylated styrene or a mixture thereof and 3 to 30% at least one rubbery polymer conforming to the formula p-(S)$_x$, where x denotes the number of thiol groups per rubber molecule and is an integer from 1 to 5 and P is a polymer of more than 80% conjugated dienes of 4 or 5 carbon atoms, and having an average molecular weight, as measured by gel permeation chromatography, in the range from 20,000 to 200,000 in the presence of heat or in the presence of free radical initiators, with stirring in the absence of a solvent for from 3 to 6 hours, to a conversion of from 20 to 40%, based on the monomer, stirring being carried out in such a way that thereafter the flexible component dispersed in the polystyrene has a median particle diameter of from 0.1 to 0.8 μm, and, in a second stage, dispersing the product thus obtained, after the addition of a free radical initiator, in an aqueous phase which contains suspending assistants and buffer salts, polymerization being effected in the course of from 5 to 15 hours to a conversion of from 95 to 99.95%, based on the monomer.

2. The impact-resistant translucent rubber-modified polystyrene or poly(alkyl)styrene of claim 1, wherein, in addition to the rubbery polymer P-(SH)$_x$, at least one further rubbery diene polymer having an average molecular weight within the range of from 120,000 to 400,000 is present, and the polymer P-(SH)$_x$ is present in a proportion of not less than 30%, based on the mixture.

3. The impact resistant translucent rubber-modified polystyrene as obtained by the process of claim 1, wherein P is a polymer of more than 80% conjugated dienes selected from the group consisting of butadiene, isoprene or comonomers thereof.

4. The impact resistance rubber-modified polystyrene as obtained by the process of claim 1, where P is polybutadiene and x is 1.

* * * * *

UNITED STATES PATENT AND TRADEMARK OFFICE
CERTIFICATE OF CORRECTION

PATENT NO. : 4,985,503

DATED : January 15, 1991

INVENTOR(S) : Klaus BRONSTERT et al.

It is certified that error appears in the above-identified patent and that said Letters Patent is hereby corrected as shown below:

Claim 1, line 31, column 7:

"$P-(S)_x$" should read --$P-(SH)_x$--

Signed and Sealed this

Twelfth Day of May, 1992

Attest:

DOUGLAS B. COMER

*Attesting Officer*     *Acting Commissioner of Patents and Trademarks*